United States Patent
Qiao et al.

(10) Patent No.: US 6,998,438 B2
(45) Date of Patent: *Feb. 14, 2006

(54) TOUGHENED PLASTICS AND PREPARATION THEREOF

(75) Inventors: Jinliang Qiao, Beijing (CN); Shijun Zhang, Beijing (CN); Xiaohong Zhang, Beijun (CN); Yiqun Liu, Beijing (CN); Jianming Gao, Beijing (CN); Wei Zhang, Beijing (CN); Genshuan Wei, Beijing (CN); Jingbo Shao, Beijing (CN); Hua Yin, Beijing (CN); Renli Zhai, Beijing (CN); Zhihai Song, Beijing (CN); Fan Huang, Beijing (CN); Jiuqiang Li, Beijing (CN)

(73) Assignees: China Petroleum & Chemical Corporation, Beijing (CN); Beijing Research Institute of Chemical Industry, Beijing (CN)

( * ) Notice: Subject to any disclaimer, the term of this patent is extended or adjusted under 35 U.S.C. 154(b) by 208 days.

This patent is subject to a terminal disclaimer.

(21) Appl. No.: 10/126,461

(22) Filed: Apr. 18, 2002

(65) Prior Publication Data

US 2002/0188079 A1 Dec. 12, 2002

Related U.S. Application Data

(63) Continuation of application No. PCT/CN01/01265, filed on Aug. 22, 2001.

(30) Foreign Application Priority Data

Aug. 22, 2000 (CN) .............................. 00123559 A
Nov. 3, 2000 (CN) .............................. 00130387 A (51) Int. Cl.
  C08L 51/00 (2006.01)
  C08L 59/02 (2006.01)
  C08L 67/00 (2006.01)
  C08L 69/00 (2006.01)
  C08L 75/00 (2006.01)

(52) U.S. Cl. .......................... 525/64; 525/66; 525/67; 525/68; 525/78; 525/101; 525/106; 525/131; 525/132; 525/151; 525/154; 525/163; 525/167; 525/176; 525/183; 525/184; 525/185; 525/191; 525/221

(58) Field of Classification Search ................. 525/64, 525/68, 66, 78, 67, 101, 106, 131, 132, 151, 525/154, 163, 167, 176, 183, 184, 185, 191, 525/221

See application file for complete search history.

(56) References Cited

U.S. PATENT DOCUMENTS

| 3,319,353 | A | | 5/1967 | Matsunami et al. |
|---|---|---|---|---|
| 4,141,863 | A | | 2/1979 | Coran et al. |
| 4,287,324 | A | | 9/1981 | Coran et al. |
| 5,082,732 | A | | 1/1992 | Ueda et al. |
| 5,686,528 | A | * | 11/1997 | Wills et al. .................... 525/68 |
| 6,420,483 | B1 | * | 7/2002 | Mc Kee et al. ............. 525/191 |
| 6,423,760 | B1 | * | 7/2002 | Qiao et al. .................. 522/150 |
| 6,555,624 | B1 | * | 4/2003 | Nishihara et al. ........... 525/191 |

FOREIGN PATENT DOCUMENTS

| CN | 1132517 | 10/1996 |
|---|---|---|
| CN | 1150160 | 5/1997 |
| CN | 1194995 | 10/1998 |

\* cited by examiner

*Primary Examiner*—Ana Woodward
(74) *Attorney, Agent, or Firm*—Darby & Darby (57) ABSTRACT

The present invention provides plastics with high toughness and the preparation thereof. The plastics with high toughness, which have the balance of stiffness and toughness, stable properties and good processability, are obtained by blending the rubber particles having an average particle size of 20 to 200 nm with the pseudoductile plastics, wherein the weight ratio of the rubber particles to the plastics is from 0.5:99.5 to 70:30. The present invention also provides plastics with both high stiffness and high toughness and the preparation thereof. The plastics with both high stiffness and high toughness, which have also an improved heat resistance and good processability, are prepared by blending the rubber particles having an average particle size of 20 to 500 nm and the crystalline plastics, wherein the amount of the rubber particles added in the plastics matrix is from 0.3 to 5 weight parts.

16 Claims, 1 Drawing Sheet

Fig. 1

TOUGHENED PLASTICS AND PREPARATION THEREOF

This is a continuation of international application Ser. No. PCT/CN01/01265, filed Aug. 22, 2001, the entire disclosure of which is hereby incorporated by reference.

TECHNICAL FIELD OF THE INVENTION

The present invention relates to toughened plastics and preparation thereof, more particularly, to plastics with high toughness obtained by blending powdery rubbers and pseudoductile plastics, to plastics with both high stiffness and toughness obtained by blending low amount of powdery rubbers and crystalline plastics, and to a process for preparation of these plastics.

BACKGROUND OF THE INVENTION

Plastics, as a kind of widely used material, have increasingly drawn people's attention. As described in the article written by Souheng Wu of DuPont Co. in US, published in POLYMER INTERNATIONAL VOL. 29, No. 3, p229–247 (1992), plastics may be classified into pseudoductile plastics and brittle plastics due to the different characteristics and nature of macromolecular chains. Plastics with a chain entanglement density (Ve) of less than about 0.15 mmol/ml and a characteristic ratio ($C_\infty$) of greater than about 7.5 belong to a brittle plastics, where the external impact energy is dissipated mainly by forming crazes from the matrix. On the other hand, plastics with a chain entanglement density (Ve) of greater than about 0.15 mmol/ml and a characteristic ratio ($C_\infty$) of less than about 7.5 belong to pseudoductile plastics, where the external impact energy is dissipated mainly by generating the shear yield from the matrix. The toughness of either pseudoductile plastics or brittle plastics can be further improved by blending with rubbers.

Many scientists have made extensive research on the theory and method for toughening plastics. In 1980's, Souheng Wu proposed the percolation model for plastics toughening, which showed that the brittle-tough transition in the plastics takes place when the distance $\tau$ among the dispersed rubber particles is less than a certain critical distance $\tau_C$. Since the relationship between the distance $\tau$ among particles of the rubber phase and the diameter of the particles of the rubber phase (d) meets the following formula: $d=\tau[k(\pi/\Phi r)^{1/3}-1]^{-1}$, the brittle-tough transition takes place when the diameter of the rubber particles (d) is less than the critical diameter $d_C$. In other words, the smaller the size of the dispersed rubber particle is, the more easily the brittle-tough transition occurs to the plastics to be toughened. In the prior art of using rubbers to toughen plastics, the rubber serves as a toughener and blends with the plastics to obtain the toughened plastics. For example, U.S. Pat. No. 4,517,319 disclosed that DuPont Co. in U.S. selected polyurethane elastomers to toughen polyoxymethylene; EP 120711 and EP 121407 disclosed the Hoechst Co. in German selected diene graft polymer elastomers to toughen polyoxymethylene; EP 117664 disclosed the ASAHI KASEI KABUSHIKI KAISHA in Japan selected styrene block copolymer elastomers to toughen polyoxymethylene; and FR8519421, FR8803877, FR9512701 and FR9609148 of ATOCHEM Co. in France, JP127503/97 of MITSUI CHEMICALS INC. in Japan, JP190634/97 and JP190635/97 of KISHIMOTO SANGYO CO. LTD. in Japan, disclosed the techniques of using rubbers to toughen plastics, such as using maleic anhydride-grafted ethylene-propylene rubber to toughen polyamide. However, the above-mentioned patents have the drawbacks as follows: (1) at the present technology level, it is difficult to control the particle distribution of the dispersed rubber phase within a narrow range and the size smaller than 200 nm. A larger amount of rubbers is necessary for the brittle-tough transition, thereby leading to the decrease of stiffness of the toughened plastics; (2) the particle size of the rubber phase is unstable, that is to say, the particle size of the rubber phase always varies with the change of the processing parameters such as the shear rate during the processing; (3) the particle size of the rubber phase is far from uniform; (4) the rubber content cannot exceed 40 percent, otherwise it will lead to the occurrence of the "sea-sea" morphological structure, even the reversal of phase, which leads to the inferior properties of the toughened plastics.

In addition, since toughness and stiffness are two important mechanical properties of the plastics, how to largely improve the toughness of the plastics while keeping the desired stiffness, i.e. to obtain the materials with the balance of stiffness and toughness, is always the aim desired. At present, the method that can effectively improve toughness of the plastics is using elastomer materials to toughen the plastics, for example using EPR or EPDM to toughen PP, using acrylate rubber to toughen polyester, and the like. However, using elastomers as tougheners will simultaneously decrease the stiffness of plastics, such as flexural strength and flexural modulus and the like. Until now, there is no report on the improvement of both toughness and stiffness by only using elastomers such as rubbers.

In order to improve toughness of the plastics while keeping their stiffness, the process of blending rubbers with rigid inorganic fillers (such as mica, talc etc.) are generally used to modify the plastics. In other words, toughness of the plastics is improved by the elastic rubber phase while the decrease of stiffness caused by the addition of the rubber phase is compensated by the inorganic fillers added. However, when inorganic fillers are used for the purpose of reinforcement, the amount of the fillers used is generally relatively large (above 20 weight parts on the basis of 100 weight parts of plastics), which will impose various adverse influences on the toughened plastics, such as increasing the density of plastics, making the processing properties of the toughened plastics inferior, and the like.

In addition, inorganic rigid particles may also be used to toughen some plastics (the plastics with certain toughness) while keeping stiffness of the plastics from decreasing, i.e. the so-called rigid particles-toughening method (see Dongming Li and Zongneng Qi, "The fracture of $CaCO_3$ reinforced polypropylene composite", Polymer Materials Science & Engineering, 1991, No. 2, p18–25). However, as far as the rigid particles-toughening method concerned, its toughening effects is very limited, and the method is not applied at an industrial scale and is still under exploratory development.

Inorganic nano-particles may also be used for the purpose of toughening while keeping the stiffness. For example, ACTA POLYMERIC SINICA, No. 1, p99–104 (2000)(Chinese) discloses the use of nano-$SiO_2$ for polypropylene toughening which has both toughening and reinforcing effects on PP at room temperature when the content of $SiO_2$ is from 1.5 to 5 percent. However, during the industrial processing, the use of inorganic nano-particles for toughening plastics still causes some problems such as the relatively poor dispersion in the resin matrix, thereby influencing the final toughening effect.

SUMMARY OF THE INVENTION

After carrying out extensive and intensive research, the inventor found a kind of specific powdery rubber used as the rubber toughener, which is other than the above-mentioned tougheners, and its particle size can reach nano scale and it can be easily dispersed in the resin. Compared with conventional rubber tougheners, the toughener according to the invention has much better toughening effect, when it is used to toughen pseudoductile plastics at relatively high loading content (above 10 weight parts on the basis of 100 weight parts of the plastics). When the same toughening target is achieved, the amount of the rubber toughener according to the invention may be substantially less than that of others, thereby the loss of stiffness of the plastics toughened by the toughener according to the invention is lower than that of the plastics toughened by conventional rubbers, which facilitates the achievement of relatively ideal effect of the stiffness-toughness balance. Moreover, when the amount used is relatively low, as for some resins, particularly some crystalline plastics, such as polypropylene, polyethylene and PBT etc., the rubber toughener according to the invention can simultaneously improved both toughness and stiffness of plastics, and can also improve the heat distortion temperature and the crystallizing temperature of the materials so as to achieve the excellent balance of toughness and stiffness as long as the good dispersion of the powdery rubber in the plastics matrix is ensured. This shows that a very small amount of the ultra-fine powdery rubber added to the crystalline plastics can function not only as a toughener, but also as a reinforcing agent.

Therefore, one object of the invention is to provide plastics with high toughness, where the rubber phase has a small average particle size and it is uniform and stable. The reversal of phase will not occur even if the rubber content is up to 70 weight percent, and the rubber is always kept as the dispersed phase. The plastics with high toughness have relatively high toughness, while also maintaining the above-mentioned stiffness.

Another object of the invention is to provide plastics with both high stiffness and high toughness, which contain a small amount of ultra-fine powdery rubber toughener. The plastics with both high toughness and high stiffness possess higher stiffness and toughness as compared with the pure plastics matrix.

Still another object of the invention is to provide a process for preparing the plastics with high toughness or the plastics with both high stiffness and high toughness, which is simple and easy to operate.

The first aspect of the invention provides plastics with high toughness, which comprise the following components: pseudoductile plastics with a macromolecular chain entanglement density (Ve) of greater than about 0.15 mmol/ml and a characteristic ratio ($C_\infty$) of less than about 7.5; and rubber particles with an average particle size of 20 to 200 nm, wherein the weight ratio of the rubber particles to the plastics is in a range of from 0.5:99.5 to 70:30. The toughened plastics have the integral property of better balance of stiffness and toughness.

The second aspect of the invention provides plastics with both high stiffness and high toughness, which comprise the following components: crystalline plastics; and rubber particles with an average particle size of 20 to 500 nm, wherein the amount of the rubber particles added to the plastics matrix is from 0.3 to 5 weight parts on the basis of 100 weight parts of the plastics matrix.

The third aspect of the invention provides a process for preparing the plastics with high toughness according to the invention, which comprises blending the pseudoductile plastics with a macromolecular chain entanglement density (Ve) of greater than about 0.15 mmol/ml and a characteristic ration ($C_\infty$) of less than about 7.5 with the rubber particles having an average particle size of 20 to 200 nm, wherein the weight ratio of the rubber particles to the plastics is from 0.5:99.5 to 70:30.

The fourth aspect of the invention provides a process for preparing the plastics with both high stiffness and high toughness, which comprises melt blending the crystalline plastics with the rubber particles having an average particle size of 20 to 500 nm, wherein the amount of the rubber particles added to the plastics matrix is from 0.3 to 5 weight parts on the basis of 100 weight parts of the plastics matrix.

DETAIL DESCRIPTION OF THE INVENTION

In the plastics with high toughness according to the invention, the weight ratio of the rubber particles to the plastics is from 0.5:99.5 to 70:30, preferably from 5:95 to 50:50. The average particles size of the rubber particles is from 20 to 200 nm, preferably from 50 to 150 nm.

In the plastics with high toughness according to the invention, the plastics used as the continuous phase are the pseudoductile plastics with a macromolecular chain entanglement density (Ve) of greater than about 0.15 mmol/ml and a characteristic ratio ($C_\infty$) of less than about 7.5, which may be selected from the group consisting of polypropylene, polyethylene, polyamide, polyoxymethylene, polycarbonate, polyester, polyphenylene oxide or polyurethane and the like.

In the plastics with high toughness according to the invention, the rubber particles used as the dispersed phase are the rubber particles with a homogeneous micro-structure, preferably the crosslinked rubber particles with a gel content of not less than 60 percent. The rubber particles are the fully vulcanized powdery rubber obtained according to the inventor's Chinese Patent Application No. 99125530.5 filed on Dec. 3, 1999 (its full text is incorporated herein by reference), which particularly include, but not limited to, at least one of the following fully vulcanized powdery rubber: fully vulcanized powdery natural rubber, fully vulcanized powdery butadiene-styrene rubber, fully vulcanized powdery carboxylic butadiene-styrene rubber, fully vulcanized powdery butadiene-acrylonitrile rubber fully vulcanized powdery carboxylic butadiene-acrylonitrile rubber, fully vulcanized powdery chlorobutadiene rubber, fully vulcanized powdery polybutadiene rubber, fully vulcanized powdery silicon rubber or fully vulcanized powdery acrylate rubber and the like, and the preparation thereof is referred to the above-mentioned Chinese Patent Application No. 99125530.5. The fully vulcanized powdery rubber is the dispersed fine rubber powder which has a gel content of above 60 percent and can freely flow after drying without the addition of the partitioning agent. The particle size of the powdery rubber particles can be fixed by irradiation-crosslinking. When the fully vulcanized powdery rubber is mixed with the plastics, the particles are very easy to uniformly and stably disperse in the plastics, are difficult to aggregate, and can keep a very small particle size.

The plastics with high toughness according to the invention contain the rubber phase which has a small, uniform and stable particle size and is easy to obtain a high ratio of the rubber to the plastics, have high toughness and good processability, and are applicable for very wide fields.

In the plastics with both high stiffness and high toughness according to the invention, the amount of the rubber particles used is from 0.3 to 5 weight parts, preferably from 0.5 to 2 weight parts, on the basis of 100 weight parts of the plastics matrix. The average particle size of the rubber particles is from 20 to 500 nm, preferably from 50 to 300 nm.

In the plastics with both high stiffness and high toughness according to the invention, the plastics used as the continuous phase are the crystalline plastics, which may be selected from the group consisting of polypropylene, polyethylene, polyamides, polyoxymethylene, polybutylene, terephthalate (PBT), polyethylene terephthalate (PET) and the like.

In the plastics with both high stiffness and high toughness according to the invention, the rubber particles used as the dispersed phase are the rubber particles having a homogeneous micro-structure, preferably the crosslinked rubber particles with a gel content of not less than 60 percent. The rubber particles may be the fully vulcanized powdery rubber obtained according to the inventor's Chinese Patent Application No. 99125530.5 filed on Dec. 3, 1999 (its full text is incorporated herein by reference), and details of the rubber particles are as described above in discussion on the plastics with high toughness. The fully vulcanized powdery rubber is the dispersed fine rubber powder, which has a gel content of above 60 percent and can freely flow after drying without the addition of a partitioning agent. The fully vulcanized powdery rubber can be obtained by irradiation-crosslinking of the rubber latex. When the fully vulcanized powdery rubber is mixed with the plastics, the particles are very easy to uniformly and stably disperse in the plastics, are difficult to aggregate, and can keep a very small particle size.

The plastics with both high stiffness and high toughness according to the invention contain the rubber phase with a small, uniform and stable particle size, have high stiffness, high toughness, higher heat distortion temperature and good processability, and are applicable for very wide fields.

The plastics with high toughness according to the invention can be obtained by blending the pseudoductile plastics with a macromolecular chain entanglement density (Ve) of greater than about 0.15 mmol/ml and a characteristic ratio ($C_\infty$) of less than about 7.5 with the above-mentioned rubber particles with an average particle size of 20 to 200 nm. The average particle size of the rubber particles is from 50 to 150 nm. The weight ratio of the rubber particles to the plastics is from 0.5:99.5 to 70:30, preferably from 5:95 to 50:50.

The plastics with both high stiffness and high toughness according to the invention can be obtained by blending the crystalline plastics with the above-mentioned rubber particles with an average particle size of 20 to 500 nm. The amount of the rubber particles added to the plastics matrix is 0.3 to 5 parts, preferably 0.5 to 2 parts, on the basis of 100 weight parts of the plastics matrix. The average particle size of the rubber particles is preferably from 50 to 300 nm.

In the process for preparing the plastics with high toughness and the plastics with both high stiffness and high toughness according to the invention, the fully vulcanized powdery rubber may be added in the form of dry crosslinked powders or in the form of undried crosslinked latex.

In the above-mentioned preparation, the blending temperature of the materials is the blending temperature commonly used in the processing of conventional plastics, which is dependent on the melting or softening temperature of the plastics matrix and should be selected within the range that can ensure the complete melting of the plastics matrix without making the plastics decompose. Furthermore, according to the need of the processing, the aids conventionally used in plastics processing, such as plasticizer, antioxidant, light stabilizer and compatilizer and the like, may be added to the blended materials in an appropriate amount.

The blending equipments used in the present invention are the general blending equipments commonly used in the processing of rubber and plastics, which may be selected from single-screw extruder, twin-screw extruder, two roll mill or internal mixer, and the like.

The process for preparing the plastics with high toughness or the plastics with both high stiffness and high toughness according to the invention is simple and easy to operate, and is applicable for the purpose of toughening various plastics.

EXAMPLES

The following examples are presented to further illustrate the present invention and are not to be understood as limiting the scope of the invention. The scope of the invention will be defined in the claims.

Preparation Examples of the Plastics with High Toughness

Examples 1 and 2

The fully vulcanized powdery butadiene-styrene rubber (obtained as follows: in the butadiene-styrene-50 latex available from Lanzhou Latex Research Center, 3 percent of trimethylolpropane triacrylate used as a crosslinking aid, based on the dry weight of the butadiene-styrene latex, is added. The mixture is subjected to irradiation-vulcanization with the absorbed dose being 2.5 megarads, and then subjected to spray-drying; the powdery rubber obtained has an average particle size of 100 nm and a gel content of 90.4 percent) and polypropylene powder (available from Tianjin Second Petroleum-Chemical Factory, designation: Model 3-1) and antioxidant 1010 (available from Ciba-Geigy, Switzerland) are uniformly mixed.

The blending and pelleting are conducted in the ZSK-25 twin-screw extruder (manufactured by Werner & Pfleiderer Co., in Germany) with the temperatures for each zone of the extruder being respectively 170° C., 185° C., 190° C., 190° C., 190° C. and 190° C. (the die temperature). The specific formulations are listed in Table 1, wherein the component contents of the fully vulcanized powdery butadiene-styrene rubber and polypropylene are measured in weight parts, and the content of the antioxidant is measured in weight percent of the total of all components. The pellets are injection-molded into standard specimens, and then subjected to various tests for mechanical properties. The test standard and the results obtained are listed in Table 1.

Comparative Example 1

Polypropylene powder and the antioxidant used in Example 1 are uniformly mixed and then are pelletized in the twin-screw extruder, using the same conditions as those used in Example 1. The specific formulations and the results obtained are listed in Table 1.

Example 3

The fully vulcanized powdery butadiene-styrene rubber (same as that used in Example 1) and polypropylene pellets (T30S, Jinan Refinery, China) and the antioxidant 1010 (Ciba-Geigy, Switzerland) are uniformly mixed and then are blended and pelletized in the twin-screw extruder under the same processing conditions as described above in Example 1. The specific formulations are listed in Table 1, wherein the component contents of the fully vulcanized powdery butadiene-styrene rubber and polypropylene are measured in weight parts, and the content of the antioxidant is measured in weight percent of the total of all components. The pellets are injection-molded into standard specimens, and then subjected to various tests of mechanical properties. The test standard and the results obtained are listed in Table 1.

Comparative Example 2

Figure 1:
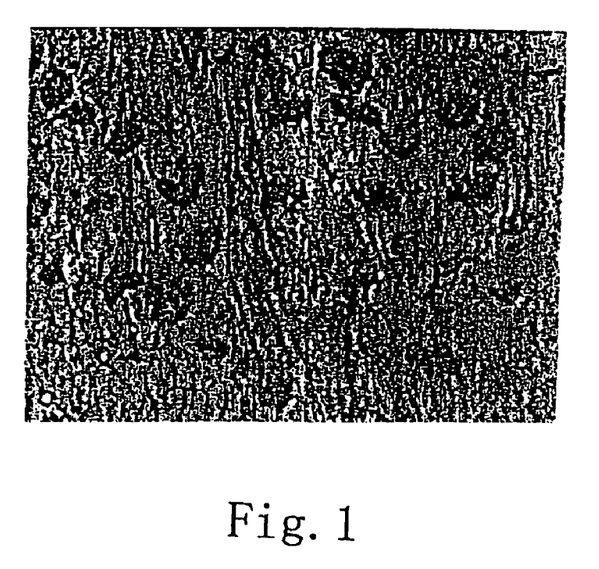
FIG. 1 is an atomic force microscopy photograph of the sample obtained in Example 5, wherein the magnification is 40,000.

The polypropylene pellets used in Example 3 and ethylene propylene terpolymer rubber pellets (3745, DuPont Dow Co.) are uniformly mixed in a weight ratio of 9 to 1, and the antioxidant 1010 (same as that used in Example 1) is added. The mixture is blended and pelletized in the extruder under the same processing conditions as described above in Example 1. The pellets obtained are injection-molded into standard specimens, and then subjected to various tests of mechanical properties. The test standard and the results obtained are listed in Table 1.

uniformly mixed. The blending and pelleting are conducted in the ZSK-25 twin-screw extruder (manufactured by Werner & Pfleiderer Co., in Germany) with the temperatures for each zone of the extruder being respectively 230° C., 235° C., 240° C., 245° C., 240° C. and 235° C. (the die temperature). The specific formulations are listed in Table 2, wherein the component contents of the fully vulcanized powdery carboxylic butadiene-styrene rubber and Nylon 6 are measured in weight parts, and the contents of the other aids are measured in weight percent of the total of all components. The pellets are dried and injection-molded into standard specimens, and then subjected to various tests for mechanical properties. The test standard and the results obtained are listed in Table 2. FIG. 1 shows the atomic force microscopy photograph of the sample in Example 5 (the magnification is 40,000), wherein the black shadow indicates the fully vulcanized powdery carboxylic butadiene-styrene rubber particles dispersed in Nylon 6 matrix.

Comparative Example 3

Nylon 6, calcium stearate and ultra-fine talc used in Example 4 are uniformly mixed and pelletized in the twin-screw extruder, using the same conditions as those used in Example 4. The specific formulations, test standard and the results obtained are listed in Table 2.

Comparative Example 4

Nylon 6 used in Example 4 and acrylate rubber (Lucite44-N, Dupont Co. in U.S.) and the calcium stearate and ultra-fine talc used in Example 4 are uniformly mixed, and then

TABLE 1

| | Polypropylene | Fully vulcanized powdery butadiene-styrene rubber | Ethylene propylene terpolymer rubber | Antioxidant | Tensile strength | Elongation at break | Notched Izod impact strength | Flexural strength | Flexural modulus |
|---|---|---|---|---|---|---|---|---|---|
| Example 1 | 94 | 6 | — | 0.5% | 31.0 | 221 | 129 | 33.3 | 1.51 |
| Example 2 | 30 | 70 | — | 0.5% | 10.5 | 220 | 311 (not break) | — | — |
| Comparative example 1 | 100 | 0 | — | 0.5% | 39.1 | 92 | 78.1 | 38.7 | 1.63 |
| Example 3 | 90 | 10 | — | 0.5% | 28.4 | 211 | 87.4 | 28.4 | 1.28 |
| Comparative example 2 | 90 | 0 | 10 | 0.5% | 28.7 | 171 | 70.0 | 29.1 | 1.33 |
| Unit | — | — | — | — | MPa | % | J/m | MPa | GPa |
| Total standard | — | — | — | — | ASTM D638 | ASTM D638 | ASTM D256 | ASTM D790 | ASTM D790 |

Examples 4 and 5

The fully vulcanized powdery carboxylic butadiene-styrene rubber (obtained as follows: in the carboxylic butadiene-styrene latex designated as XSBRL-54B1 available from Yanshan Petroleum-Chemical Co., 3 percent of isooctyl acrylate used as a crosslinking aid, based on dry weight of the carboxylic butadiene-styrene latex, is added. The mixture is subjected to irradiation-vulcanization with the absorbed dose being 2.5 megarads, and then subjected to spray-drying; the powdery rubber obtained has an average particle size of 150 nm and a gel content of 92.6 percent), Nylon 6 (1013B, UBE INDUSTRIES, LTD., Japan), calcium stearate (chemical pure grade, Beijing Changyang Chemical Factory, China) and ultra-fine talc (1250 mesh, Hebei Luquan Architectural Materials Factory, China) are are blended and pelletized in the twin-screw extruder, using the same conditions as those used in Example 4. The specific formulations are listed in Table 2, wherein the component contents of the acrylate rubber and Nylon 6 are measured in weight parts, and the other aids are measured in weight percent of the total of all components. The test standard and the results of properties are listed in Table 2.

Comparative Example 5

Nylon 6 used in Example 4 and POE-g-MAH (DF-DAI373, United Carbide Co. in U.S.) and the calcium stearate and ultra-fine talc used in Example 4 are uniformly mixed, and then are blended and pelletized in the twin-screw extruder, using the same conditions as those used in Example 4. The specific formulations are listed in Table 2, wherein the component contents of POE-g-MAH and Nylon 6 are measured in weight parts, and the other aids are measured in weight percent of the total of all components. The test standard and the results of properties are listed in Table 2.

Example 6

The procedures of Examples 4 and 5 are repeated, except that the ratio of the powdery carboxylic butadiene-styrene rubber to Nylon 6 is changed to 15:85. The test standard and the results obtained are listed in Table 2.

respectively 175° C., 180° C., 185° C.,185° C., 180° C. and 175° C. (the die temperature). The specific formulations are listed in Table 3, wherein the component contents of the fully vulcanized powdery carboxylic butadiene-styrene rubber and polyoxymethylene are measured in weight parts, and the contents of the other aids are measured in weight percent of the total of all components. The pellets are dried and injection-molded into standard specimens, and then subjected to various tests for mechanical properties. The test standard and the results obtained are listed in Table 3.

TABLE 2

|  | Example 4 | Example 5 | Example 6 | Comparative example 3 | Comparative example 4 | Comparative example 5 | Unit | Test standard |
|---|---|---|---|---|---|---|---|---|
| Nylon 6 | 90 | 80 | 85 | 100 | 80 | 80 | — | — |
| Fully vulcanized powdery carboxyl butadiene-styrene rubber | 10 | 20 | 15 | — | — | — | — | — |
| Acrylate rubber | — | — | — | — | 20 | — | — | — |
| POE-g-MAH | — | — | — | — | — | 20 | — | — |
| Calcium stearate | 0.6% | 0.6% | 0.6% | 0.6% | 0.6% | 0.6% | — | — |
| Ultra-fine talc | 0.8% | 0.8% | 0.8% | 0.8% | 0.8% | 0.8% | — | — |
| Tensile strength | 62.6 | 51.5 | 56.1 | 72 | 52.1 | 53.2 | MPa | ASTM D638 |
| Elongation at break | 75 | 175 | 135 | 60 | 120 | 135 | % | ASTM D638 |
| Flexural strength | 72.8 | 56.6 | 63.4 | 80.5 | 57.2 | 55.6 | MPa | ASTM D 790 |
| Flexural modulus | 1.97 | 1.72 | 1.81 | 2.2 | 1.78 | 1.75 | GPa | ASTM D790 |
| Notched Izod impact strength | 176 | 665 | 428 | 45 | 325 | 409 | J/m | ASTM D256 |
| Heat distortion temperature (1.82 MPa) | 64.2 | 61.8 | 62.7 | 68.5 | 59.8 | 59.6 | ° C. | ASTM D648 |

Examples 7 and 8

The fully vulcanized powdery carboxylic butadiene-styrene rubber (obtained as follows: in the carboxylic butadiene-styrene rubber latex XSBRL-54B1 from Yanshan Petroleum-Chemical Co., 3 percent of isooctyl acrylate used as a crosslinking aid, based on the dry weight of the carboxylic butadiene-styrene rubber latex, is added. The mixture is subjected to irradiation-vulcanization with the absorbed dose being 2.5 megarads, and then subjected to spray-drying; the powdery rubber obtained has an average particle size of 150 nm and a gel content of 92.6 percent), polyoxymethylene (4520, ASAHI KASEI KABUSHIKI KAISHA, in Japan) calcium stearate (chemical pure grade, Beijing Changyang Chemical Factory), polyethylene wax (chemical pure grade, Beijing University of Chemical Technology,), antioxidant 1010 (Ciba-Geigy in Switzerland) and ultra-fine talc (1250 mesh, Hebei Luquan Architectural Materials Factory) are uniformly mixed. The blending and pelleting are conducted in the ZSK-25 twin-screw extruder (manufactured by Werner & Pfleiderer Co., in Germany) with the temperatures for each zone of the extruder being Comparative Example 6

Polyoxymethylene, calcium stearate, antioxidant 1010, polyethylene wax and ultra-fine talc used in Example 7 are uniformly mixed and pelletized in the twin-screw extruder, using the same conditions as those used in Example 7. The specific formulations, test standard and the results obtained are listed in Table 3.

Comparative Example 7

Polyoxymethylene used in Example 7 and acrylate rubber (Lucite44-N, DuPont Co. in U.S.) and the calcium stearate and ultra-fine talc used in Example 7 are uniformly mixed, and then are blended and pelletized in the twin-screw extruder, using the same conditions as those used in Example 7. The specific formulations are listed in Table 3, wherein the component contents of the acrylate rubber and polyoxymethylene are measured in weight parts, and the other aids are measured in weight percent of the total of all components. The test standard and the results obtained are listed in Table 3.

TABLE 3

|  | Example 7 | Example 8 | Comparative example 6 | Comparative example 7 | Unit | Test standard |
|---|---|---|---|---|---|---|
| Polyoxymethylene | 85 | 72 | 100 | 85 | — | — |
| Fully vulcanized powdery carboxyl butadiene-styrene rubber | 15 | 28 | — | — | — | — |

TABLE 3-continued

|  | Example 7 | Example 8 | Comparative example 6 | Comparative example 7 | Unit | Test standard |
|---|---|---|---|---|---|---|
| Acrylate rubber | — | — | — | 15 | — | — |
| Calcium stearate | 0.7% | 0.7% | 0.7% | 0.7% | — | — |
| Polyethylene wax | 0.3% | 0.3% | 0.3% | 0.3% |  |  |
| Ultra-fine talc | 0.3% | 0.3% | 0.3% | 0.3% | — | — |
| Antioxidant 1010 | 0.4% | 0.4% | 0.4% | 0.4% |  |  |
| Tensile strength | 54.3 | 41.2 | 60.2 | 50.1 | MPa | ASTM D 638 |
| Elongation at break | 62 | 215 | 30 | 42 | % | ASTM D 638 |
| Flexural strength | 67.3 | 46.7 | 82.5 | 64.5 | MPa | ASTM D 790 |
| Flexural modulus | 1.81 | 1.35 | 2.34 | 1.83 | GPa | ASTM D790 |
| Notched Izod impact strength | 189 | 562 | 42 | 146 | J/m | ASTM D 256 |
| Heat distortion temperature (1.82 MPa) | 83.5 | 63.2 | 110 | 84.2 | ° C. | ASTM D 648 |

Example 9

The fully vulcanized powdery butyl acrylate rubber (obtained as follows: in the butyl acrylate rubber latex BC-01 available from Beijing Oriental Chemical Factory, 3 percent of isooctyl acrylate used as a crosslinking aid, based on dry weight of the butyl acrylate rubber latex, is added. The mixture is subjected to irradiation-vulcanization with the absorbed dose being 2.5 megarads, and then subjected to spray-drying; the powdery rubber obtained has an average particle size of 100 nm and a gel content of 87.7 percent) and polycarbonate (141R, General Electronics Co. in US) are uniformly mixed. The blending and pelleting are conducted in the ZSK-25 twin-screw extruder, (manufactured by Werner & Pfleiderer Co., in Germany) with the temperatures for each zone of the extruder being respectively 265° C., 270° C., 275° C., 275° C., 270° C. and 265° C. (the die temperature). The specific formulations are listed in Table 4, wherein the component contents of the fully vulcanized powdery butyl acrylate rubber and polycarbonate are measured in weight parts. The pellets are dried and injection-molded into standard specimens, and then subjected to various tests for mechanical properties. The test standard and the results obtained are listed in Table 4.

Comparative Example 8

The polycarbonate used in Example 9 is directly injection-molded into standard specimens, and then subjected to various tests for mechanical properties. The test standard and the results obtained are listed in Table 4.

TABLE 4

|  | Example 9 | Comparative example 8 | Unit | Test standard |
|---|---|---|---|---|
| Polycarbonate | 96 | 100 | — | — |
| Fully vulcanized powdery butyl acrylate rubber | 4 | — | — | — |
| Tensile strength | 64.8 | 65.2 | MPa | ASTM D638 |
| Elongation at break | 175 | 115 | % | ASTM D638 |
| Flexural strength | 96.5 | 92.1 | MPa | ASTM D790 |
| Flexural modulus | 2.32 | 228 | GPa | ASTM D790 |
| Notched Izod impact strength | 785 | 679 | J/m | ASTM D256 |
| Heat-distortion temperature (1.82 MPa) | 129.6 | 132.0 | ° C. | ASTM D648 |

Preparation Examples of the Plastics with Both High Stiffness and High Toughness Example 10

The polypropylene pellets (T30S, Jinan Refinery, China) and the fully vulcanized powdery polybutadiene rubber (obtained as follows: in the polybutadiene rubber latex 0700 from Jilin Chemical Synthesized Resin Factory, 3 percent of trimethylolpropane triacrylate used as a crosslinking aid, based on the dry weight of the rubber latex, is added. The mixture is subjected to irradiation-vulcanization with the absorbed dose being 2 megarads, and then subjected to spray-drying; the powdery rubber obtained has an average particle size of 280 nm and a gel content of 88.5 percent) and antioxidant 1010 (Ciba-Geigy, Switzerland) are compounded, wherein the specific composition on the basis of 100 weight parts of the plastics are: 100 parts of polypropylene, 0.5 parts of the fully vulcanized powdery polybutadiene rubber, and 0.5 parts of the antioxidant. The blending and pelleting are conducted in the ZSK-25 twin-screw extruder (manufactured by Werner & Pfleiderer Co., in Germany) with the temperatures for each zone of the extruder being respectively 170° C., 185° C., 190° C., 190° C.,190° C. and 190° C. (the die temperature). The pellets are injection-molded into standard specimens, and then subjected to various tests for mechanical properties. The results obtained are listed in Table 5.

Example 11

The conditions are the same as those used in Example 10, except that the amount of the fully vulcanized powdery polybutadiene rubber used in Example 10 is changed to 1 part. The pellets are injection-molded into standard specimens, and then subjected to various tests for mechanical properties. The results obtained from the mechanical tests are listed in Table 5.

Example 12

The conditions are the same as those used in Example 10, except that the amount of the fully vulcanized powdery polybutadiene rubber used in Example 10 is changed to 1.5 parts. The pellets are injection-molded into standard specimens, and then subjected to various tests for mechanical properties. The results obtained from the mechanical tests are listed in Table 5.

Example 13

The conditions are the same as those used in Example 10, except that the amount of the fully vulcanized powdery polybutadiene rubber used in Example 10 is changed to 2 parts. The pellets are injection-molded into standard specimens, and then subjected to various tests for mechanical properties. The results obtained from the mechanical tests are listed in Table 5.

Comparative Example 9

The polypropylene pellets used in Example 10 are directly injection-molded into standard specimens, and then subjected to various tests for mechanical properties. The results obtained from the mechanical tests are listed in Table 5.

Comparative Example 10

The conditions are the same as those used in Example 11, except that the fully vulcanized powdery polybutadiene rubber used in Example 11 is replaced with butadiene-styrene rubber (1502, Jilin Organic Synthesis Factory, China). The pellets are injection-molded into standard specimens, and then subjected to various tests for mechanical properties. The results obtained from the mechanical tests are listed in Table 5.

Example 14

The polypropylene powder (Model 3-1, Tianjin Second petroleum-Chemical Factory, China) and the fully vulcanized powdery butadiene-styrene rubber latex (obtained as follows: in the butadiene-styrene-50 rubber latex available from Lanzhou Latex Research Center, which has a solid content of 45 percent, 3 percent of trimethylolpropane triacrylate used as a crosslinking aid, based on the dry weight of the butadiene-styrene rubber latex, is added. The mixture is subjected to irradiation-vulcanization with the absorbed dose being 2.5 megarads; the rubber latex particles have an average particle size of 100 nm and a gel content of 90.4 percent) and antioxidant 1010 (Ciba-Geigy, Switzerland) are compounded, wherein the specific composition measured in weight parts are: 100 parts of polypropylene, 2 parts of the fully vulcanized powdery butadiene-styrene rubber latex (based on the dry weight of the rubber latex), and 0.5 parts of the antioxidant. The blending and pelleting are conducted in the ZSK-25 twin-screw extruder (manufactured by Werner & Pfleiderer Co., in Germany) with the temperatures for each zone of the extruder being respectively 170° C., 185° C., 190° C., 190° C., 190° C. and 190° C. (the die temperature). The pellets are injection-molded into standard specimens, and then subjected to various tests for mechanical properties. The results obtained are listed in Table 5.

Comparative Example 11

The polypropylene powder and the antioxidant used in Example 14 are mixed and extruded, and then injection-molded into standard specimens, and then subjected to various tests for mechanical properties. The results obtained from the mechanical tests are listed in Table 5.

TABLE 5

| Unit | Tensile strength MPa | Elongation at break % | Notched Izod impact strength J/m | Flexural strength MPa | Flexural modulus GPa | Heat distortion temperature ° C. |
|---|---|---|---|---|---|---|
| Example 10 | 32.9 | 656 (not break) | 56.2 | 36.5 | 1.70 | 107.5 |
| Example 11 | 34.7 | 698 (not break) | 54.0 | 37.5 | 1.75 | 108.6 |
| Example 12 | 34.0 | 386 | 59.9 | 35.4 | 1.61 | 107.2 |
| Example 13 | 33.7 | 413 (not break) | 64.8 | 33.8 | 1.48 | 104.1 |
| Comparative example 9 | 34.8 | 502 | 46.8 | 34.4 | 1.56 | 103.0 |
| Comparative example 10 | 34.3 | 697 | 50.6 | 33.6 | 1.56 | 104.4 |
| Example 14 | 35.6 | 92 | 89.2 | 41.7 | 1.99 | — |
| Comparative example 11 | 39.1 | 92 | 78.1 | 38.7 | 1.63 | — |
| Test standard | ASTM D638 | ASTM D638 | ASTM D256 | ASTM D790 | ASTM D790 | ASTM D648 |

Example 15

The fully vulcanized powdery butyl acrylate rubber (obtained as follows: in the butyl acrylate rubber latex BC-01 available from Beijing Oriental Chemical Factory, 3 percent of isooctyl acrylate used as a crosslinking aid, based on the dry weight of the butyl acrylate rubber latex, is added. The mixture is subjected to irradiation-vulcanization with the absorbed dose being 2.5 megarads, and then subjected to spray-drying; the powdery rubber obtained has an average particle size of 100 nm and a gel content of 87.7 percent), polyethylene terephthalate (the intrinsic viscosity is 0.76, Yanshan Petroleum-chemical Co., China), calcium stearate (chemical pure grade, Beijing Changyang Chemical Factory, China) and ultra-fine talc (1250 mesh, Hebei Luquan Architectural Materials Factory, China) are uniformly mixed, wherein the specific composition measured in weight parts are: 0.5 parts of the fully vulcanized powdery butyl acrylate rubber, 100 parts of the polyethylene terephthalate, 0.3 parts of the calcium stearate and 0.3 parts of the ultra-fine talc. The blending and pelleting are conducted in the ZSK-25 twin-screw extruder (manufactured by Werner & Pfleiderer Co., in Germany) with the temperatures for each zone of the extruder being respectively 260° C., 280° C., 280° C., 280°

C., 285° C. and 280° C. (the die temperature). The pellets are dried and injection-molded into standard specimens, and then subjected to various tests for mechanical properties. The test standard and the results obtained are listed in Table 6.

Example 16

The conditions are the same as those used in Example 15, except that the proportions of the components used in the Example 15 are changed to 1 parts of the fully vulcanized powdery butyl acrylate rubber, 100 parts of the polyethylene terephthalate. The pellets are injection-molded into standard specimens, and then subjected to various tests for mechanical properties. The results obtained from the mechanical tests are listed in Table 6.

Example 17

The conditions are the same as those used in Example 15, except that the proportions of the components used in the Example 15 are changed to 2 parts of the fully vulcanized powdery butyl acrylate rubber, 100 parts of the polyethylene terephthalate. The pellets are injection-molded into standard specimens, and then subjected to various tests for mechanical properties. The results obtained from the mechanical tests are listed in Table 6.

Example 18

The conditions are the same as those used in Example 1, except that the ratio of components used in the Example 15 are changed to 5 parts of the fully vulcanized powdery butyl acrylate rubber, 100 parts of the polyethylene terephthalate. The pellets are injection-molded into standard specimens, and then subjected to various tests for mechanical properties. The results obtained from the mechanical tests are listed in Table 6.

Comparative Example 12

The polyethylene terephthalate (same as that used in Example 15) is injection-molded into standard specimens, and then subjected to various tests for mechanical properties. The results obtained from the mechanical tests are listed in Table 6.

stearate (chemical pure grade, Beijing Changyang Chemical Factory, China) and ultra-fine talc (1250 mesh, Hebei Luquan Architectural Materials Factory, China) are uniformly mixed, wherein the specific composition measured in weight parts are: 0.5 parts of the fully vulcanized powdery butyl acrylate rubber, 100 parts of the polybutylene terephthalate, 0.3 parts of the calcium stearate and 0.3 parts of the ultra-fine talc. The blending and pelleting are carried out in the ZSK-25 twin-screw extruder (manufactured by Werner & Pfleiderer Co., in Germany) with he temperatures for each zone of the extruder being respectively 220° C., 240° C., 240° C., 240° C., 245° C. and 240° C. (the die temperature). The pellets are dried and injection-molded into standard specimens, and then subjected to various tests for mechanical properties. The test standard and the results obtained are listed in Table 7.

Example 20

The conditions are the same as those used in Example 19, except that the proportions of the components used in the Example 19 are changed to 1 parts of the fully vulcanized powdery butyl acrylate rubber, 100 parts of the polybutylene terephthalate. The pellets are injection-molded into standard specimens, and then subjected to various tests for mechanical properties. The results obtained from the mechanical tests are listed in Table 7.

Example 21

The conditions are the same as those used in Example 19, except that the proportions of he components used in the Example 19 are changed to 2 parts of the fully vulcanized powdery butyl acrylate rubber, 100 parts of the polybutylene terephthalate. The pellets are injection-molded into standard specimens, and then subjected to various tests for mechanical properties. The results obtained from the mechanical tests are listed in Table 7.

Example 22

The conditions are the same as those used in Example 19, except that the proportions of the components used in the Example 19 are changed to 5 parts of the fully vulcanized

TABLE 6

| Unit | Tensile strength MPa | Elongation at break % | Notched Izod impact strength J/m | Flexural strength MPa | Flexural modulus GPa | Heat distortion temperature ° C. |
|---|---|---|---|---|---|---|
| Example 15 | 65.8 | 18 | 39.8 | 81.1 | 2.43 | 68.1 |
| Example 16 | 68.3 | 26 | 53.8 | 84.5 | 2.52 | 70.6 |
| Example 17 | 63.5 | 25 | 51.6 | 79.7 | 2.45 | 67.9 |
| Example 18 | 54.8 | 29 | 53.1 | 72.3 | 2.19 | 63.2 |
| Comparative example 12 | 59.6 | 6 | 26.1 | 76.8 | 2.26 | 63.2 |
| Test standard | ASTM D638 | ASTM D638 | ASTM D256 | ASTM D790 | ASTM D790 | ASTM D648 |

Example 19

The fully vulcanized powdery butyl acrylate rubber (same as that used in Example 15), polybutylene terephthalate (4500, the intrinsic viscosity is 1.02, BASF Co.), calcium powdery butyl acrylate rubber, 100 parts of the polybutylene terephthalate. The pellets are injection-molded into standard specimens, and then subjected to various tests for mechanical properties. The results obtained from the mechanical tests are listed in Table 7.

Comparative Example 13

The polybutylene terephthalate (same as that used in Example 19) is injection-molded into standard specimens, and then subjected to various tests for mechanical properties. The results obtained from the mechanical tests are listed in Table 7.

TABLE 7

| Unit | Tensile strength MPa | Tensile elongation at break % | Notched Izod impact strength J/m | Flexural strength MPa | Flexural modulus GPa | Heat distortion temperature ° C. |
|---|---|---|---|---|---|---|
| Example 19 | 63.7 | 22 | 48.7 | 80.9 | 2.39 | 67.2 |
| Example 20 | 67.6 | 32 | 59.8 | 83.6 | 2.46 | 69.5 |
| Example 21 | 66.8 | 34 | 63.1 | 81.2 | 2.41 | 68.7 |
| Example 22 | 61.5 | 37 | 56.7 | 78.3 | 2.21 | 66.9 |
| Comparative example 13 | 55.2 | 9 | 31.5 | 74.3 | 2.18 | 62.8 |
| Test standard | ASTM D638 | ASTM D638 | ASTM D256 | ASTM D790 | ASTM D790 | ASTM D648 |

What we claim is:

1. Plastics with high toughness, which comprise pseudoductile plastics with a macromolecular chain entanglement density (Ve) of greater than about 0.15 mmol/ml and a characteristic ratio ($C_\infty$) of less than about 7.5; and rubber particles with an average particle size of 20 to 200 nm and a homogenous micro-structure, wherein the weight ratio of the rubber particles to the pseudoductile plastics is from 0.5:99.5 to 70:30; wherein the rubber particles are crosslinked rubber particles with a gel content of not less than 60 weight percent and are fully vulcanized powdery rubber selected from at least one of the following materials: fully vulcanized powdery natural rubber, fully vulcanized powdery butadiene-styrene rubber, fully vulcanized powdery carboxylic butadiene-styrene rubber, fully vulcanized powdery butadiene-acrylonitrile rubber, fully vulcanized powdery carboxylic butadiene-acrylonitrile rubber, fully vulcanized powdery chlorobutadiene rubber, fully vulcanized powdery polybutadiene rubber, fully vulcanized powdery silicone rubber and fully vulcanized powdery acrylate rubber.

2. The plastics with high toughness according to claim 1, characterized in that the pseudoductile plastics are selected from polypropylene, polyethylene, polyamides, polyoxymethylene, polycarbonate, polyester, polyphenylene oxide and polyurethane.

3. The plastics with high toughness according to claim 1, characterized in that the average particle size of the rubber particles is in the range of 50 to 150 nm.

4. The plastics with high toughness according to claim 1, characterized in that the weight ratio of the rubber particles to the pseudoductile plastics is from 5:95 to 50:50.

5. A process for preparing the plastics with high toughness according to claim 1, which comprises blending the pseudoductile plastics with a macromolecular chain entanglement density (Ve) of greater than about 0.15 mmol/ml and a characteristic ratio ($C_\infty$) of less than about 7.5 with the rubber particles having an average particle size of 20 to 200 nm and a homogenous micro-structure, wherein the weight ratio of the rubber particles to the pseudoductile plastics is from 0.5:99.5 to 70:30, wherein the rubber particles are fully vulcanized powdery rubber selected from at least one of the following materials: fully vulcanized powdery natural rubber, fully vulcanized powdery butadiene-styrene rubber, fully vulcanized powdery carboxylic butadiene-styrene rubber, fully vulcanized powdery butadiene-acrylonitrile rubber, fully vulcanized powdery carboxylic butadiene-acrylonitrile rubber, fully vulcanized powdery chlorobutadiene rubber, fully vulcanized powdery polybutadiene rubber, fully vulcanized powdery silicone rubber and fully vulcanized powdery acrylate rubber.

6. The process according to claim 5, characterized in that the fully vulcanized powdery rubber is added in the form of dry crosslinked powders or in the form of crosslinked rubber latex without drying.

7. Plastics with both high stiffness and high toughness, which comprise: crystalline plastics; and rubber particles with an average particle size of 20 to 500 nm and a homogenous micro-structure, wherein the amount of the rubber particles added to the crystalline plastics is from 0.3 to 5 weight parts on the basis of 100 weight parts of the crystalline plastics.

8. The plastics with both high stiffness and high toughness according to claim 7, characterized in that the crystalline plastics are selected from polypropylene, polyethylene, polyamides, polyoxymethylene, polybutylene terephthalate and polyethylene terephthalate.

9. The plastics with both high stiffness and high toughness according to claim 7, characterized in that the average particle size of the rubber particles is in the range of 50 to 300 nm.

10. The plastics with both high stiffness and high toughness according to claim 7, characterized in that the amount of the rubber particles added to the crystalline plastics is 0.5 to 2 parts on the basis of 100 weight parts of the crystalline plastics.

11. The plastics with both high stiffness and high toughness according to claim 7, characterized in that the rubber particles are crosslinked rubber particles with a gel content of not less than 60 weight percent.

12. The plastics with both high stiffness and high toughness according to claim 11, characterized in that the rubber particles are fully vulcanized powdery rubber.

13. The plastics with both high stiffness and high toughness according to claim 12, characterized in that the fully vulcanized powdery rubber is at least one selected from the following materials: fully vulcanized powdery natural rubber, fully vulcanized powdery butadiene-styrene rubber, fully vulcanized powdery carboxylic butadiene-styrene rubber, fully vulcanized powdery butadiene-acrylonitrile rubber, fully vulcanized powdery carboxylic butadiene-acrylonitrile rubber, fully vulcanized powdery chlorobutadiene rubber, fully vulcanized powdery polybutadiene rubber, fully vulcanized powdery silicone rubber and fully vulcanized powdery acrylate rubber.

14. A process for preparing the plastics with both high stiffness and high toughness according to claim 7, which comprises blending the crystalline plastics with the rubber particles having an average particle size of 20 to 500 nm and a homogenous micro-structure, wherein the amount of the rubber particles added to the crystalline plastics is from 0.3 to 5 weight parts on the basis of 100 weight parts of the crystalline plastics.

15. The process according to claim 14, characterized in that the rubber particles are fully vulcanized powdery rubber.

16. The process according to claim 15, characterized in that the fully vulcanized powdery rubber is added in the form of dry crosslinked powders or in the form of crosslinked rubber latex without drying.

* * * * *